(No Model.)

C. E. LAVERTY.
BUNG PAN.

No. 336,486. Patented Feb. 16, 1886.

Witnesses:
G. A. Taubeschmidt
W. J. [illegible]

Inventor
Charles E. Laverty
by his attorneys
Bakewell & Kerr

UNITED STATES PATENT OFFICE.

CHARLES E. LAVERTY, OF ALLEGHENY, ASSIGNOR TO J. C. DILWORTH, OF PITTSBURG, PENNSYLVANIA.

BUNG-PAN.

SPECIFICATION forming part of Letters Patent No. 336,486, dated February 16, 1886.

Application filed March 11, 1885. Serial No. 158,416. (No model.)

*To all whom it may concern:*

Be it known that I, CHARLES E. LAVERTY, of the city of Allegheny, in the county of Allegheny and State of Pennsylvania, have invented a new and useful Improvement in Bung-Pans; and I do hereby declare the following to be a full, clear, and exact description thereof, reference being had to the accompanying drawings, forming part of this specification, in which—

Figure 1:
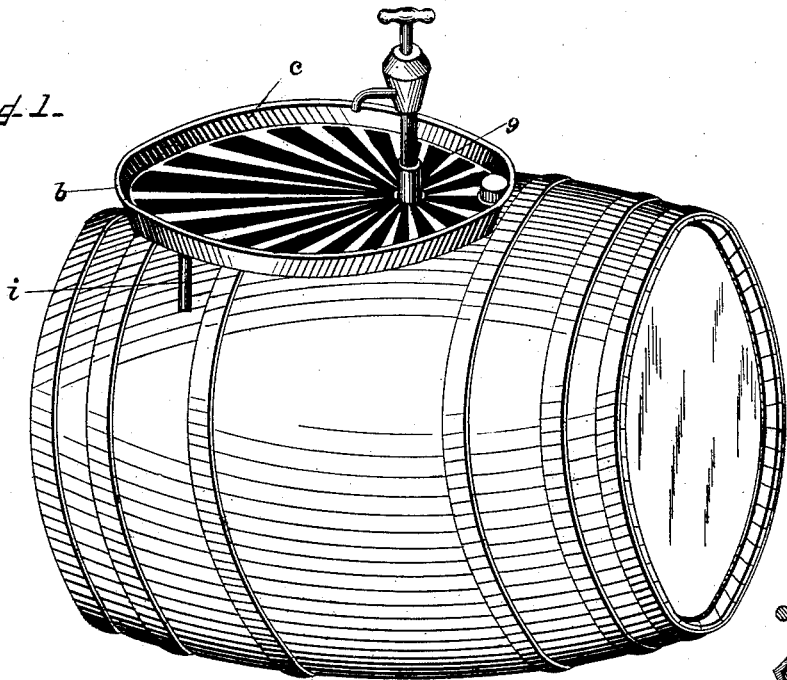
Figure 2:
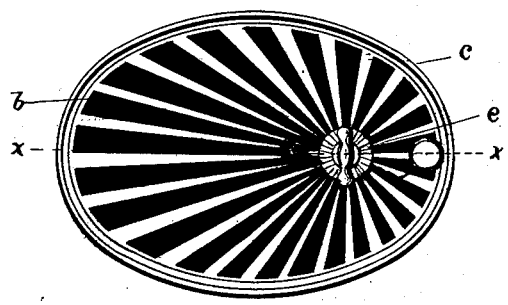
Figure 3:
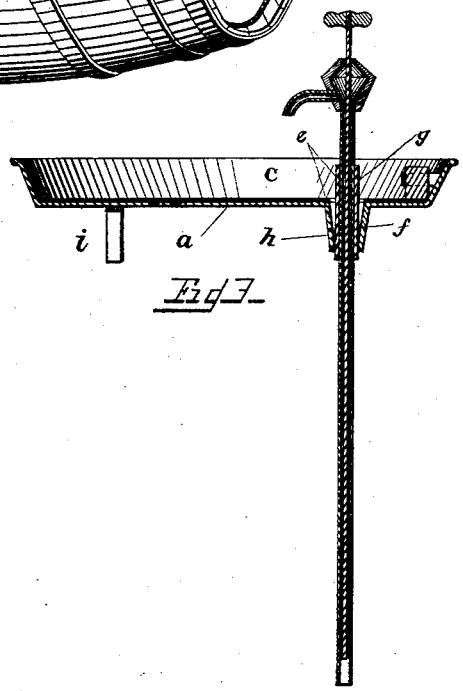

Figure 1 is a perspective view showing the manner of applying the pan to the barrel. Fig. 2 is a plan view of the pan. Fig. 3 is a vertical sectional view on the line $x$ $x$ of Fig. 2.

Like letters of reference indicate like parts wherever they occur.

My invention relates to an improvement in devices used when drawing liquids from barrels, known as "bung-pans," which in use are placed on the bilge or top of the barrel over the bung-hole, into which a tube or spout leading from the pan projects, and through which the pump passes into the barrel. The purpose of these pans is to afford a rest or support for the receptacle into which the liquid is drawn, and to collect any leakage from the pump that would otherwise fall on the outer surface of the barrel.

I will now describe my invention, so that others skilled in the art to which it appertains may manufacture and use the same.

The bottom $a$ of the pan may be formed of a single sheet of metal or other material, which is preferably provided with radial corrugations $b$, extending from a point which may be at one side of the center of the pan, and as the shape of the pan is elliptical I generally locate this point at one of the axes, which point, in addition to being the center of the radial corrugations, is somewhat depressed, the bottom being more or less concave, as is desired. Around this bottom is a rim or ledge, $c$, which may be bent up from the bottom integral therewith or formed of a separate strip of metal bent around and secured to the bottom $a$. At the point in the bottom $a$ where the corrugations meet is the tube or spout which leads from the pan into the bung-hole. This spout $e$ is formed of two tubes, the outer of which, $f$, is of the shape of the frustum of a cone, and is secured at its base to the bottom $a$, in which is an aperture leading into the tube. The second and inner tube, $g$, may be cylindrical in shape, but smaller in diameter than the base of the tube $f$, so as to leave a space between the upper portions of the two tubes, which are united at their lower ends, so that the inner tube shall serve as a support for the pump, while the outer tube, being provided with perforations $h$, acts as a conduit for the liquid which collects in the pan from the pan into the barrel, the aperture in the pan opening into the mouth of the tube. Secured to the bottom or sides of the pan, near the end away from the tube $e$, are feet or supports $i$ $i$, which may be tapered or pointed, and which rest on the side of the barrel, so as to afford a firm support to the pan when placed in position.

The advantages of my invention are, that the pan is strong and durable and affords a perfect drainage, preventing any waste of the liquid, and at the same time it is more easily adjusted than the pans now in general use.

Having thus described my invention, what I claim, and desire to secure by Letters Patent, is—

A bung-pan having a pump-tube formed of an inner cylindrical tube, $e$, and an outer conical tube having perforations at its lower end, united at its lower end to the tube $e$, and at its upper end to the pan, so as to form a space for the passage of the liquid from the pan between the tubes and into the barrel, substantially as and for the purposes specified.

In testimony whereof I have hereunto set my hand this 12th day of September, A. D. 1884.

CHARLES E. LAVERTY.

Witnesses:
W. B. CORWIN,
JAMES K. BAKEWELL.